(12) United States Patent
Kim et al.

(10) Patent No.: US 7,179,198 B2
(45) Date of Patent: Feb. 20, 2007

(54) START CLUTCH CONTROL SYSTEM AND METHOD

(75) Inventors: Jonggap Kim, Shizuoka (JP); Yasushi Yabe, Shizuoka (JP)

(73) Assignee: JATCO Ltd, Fuji (JP)

( * ) Notice: Subject to any disclaimer, the term of this patent is extended or adjusted under 35 U.S.C. 154(b) by 190 days.

(21) Appl. No.: 11/062,486

(22) Filed: Feb. 23, 2005

(65) Prior Publication Data
US 2005/0187068 A1  Aug. 25, 2005

(30) Foreign Application Priority Data
Feb. 23, 2004  (JP)  ............................. 2004-045609

(51) Int. Cl.
 *B60W 10/02* (2006.01)
(52) U.S. Cl. ..................................................... 477/176
(58) Field of Classification Search ................ 477/179, 477/176; 701/67, 68
See application file for complete search history.

(56) References Cited

U.S. PATENT DOCUMENTS

| 4,874,070 A | 10/1989 | Nellums et al. | |
|---|---|---|---|
| 5,612,874 A * | 3/1997 | Schulz et al. | 701/51 |
| 5,947,865 A * | 9/1999 | Watanabe et al. | 477/169 |
| 6,676,563 B2 | 1/2004 | Katou | |
| 2005/0071065 A1 | 3/2005 | Zimmermann et al. | |

FOREIGN PATENT DOCUMENTS

| FR | 2828659 A1 | 2/2003 |
|---|---|---|
| JP | 2000-205009 A | 7/2000 |

* cited by examiner

*Primary Examiner*—Dirk Wright
(74) *Attorney, Agent, or Firm*—Foley & Lardner LLP (57) ABSTRACT

There is provided a start clutch control system for a vehicle, including a start clutch disposed between an engine and a transmission in the vehicle, a detection unit that detects vehicle running conditions including at least a vehicle speed, and a control unit that controls engagement and disengagement of the start clutch according to the detected vehicle running conditions. The control unit has a target torque determining section to determine a target torque transmitted by the start clutch with reference to the vehicle running conditions, a torque transmission characteristic setting section to set a transmission characteristic of the target torque differently depending on the vehicle speed, a phase compensating section to make a phase compensation for the torque transmission characteristic based on actual and target mathematical models of the vehicle, and a clutch control section to control the start clutch according to the phase-compensated torque transmission characteristic.

11 Claims, 6 Drawing Sheets

FIG.8

START CLUTCH CONTROL SYSTEM AND METHOD

BACKGROUND OF THE INVENTION

The present invention relates to a start clutch control system and method for a vehicle, and more particularly relates to a technique for preventing the occurrence of vibrations of the vehicle.

For the purpose of preventing the shaking vibrations of a driving system in a vehicle, Japanese Laid-Open Patent Publication No. 2000-205009 proposes an engine throttle control apparatus that has a phase compensator (called an "inverse filter") to compensate for a phase delay in engine torque that can be caused by an air-fuel ratio change when engine throttle control is performed in response to accelerator pedal operation. Herein, the inverse filter is set based on actual and target mathematical models of the vehicle. The proposed throttle control apparatus thus determines a target engine torque Te with reference to the current actual throttle opening, makes a phase advancing compensation for the target engine torque Te depending on an air-fuel ratio change, processes the phase-compensated target engine torque Te' with the inverse filter, calculates a target throttle opening corresponding to the inverse-filtered target engine torque Te", and then, controls the engine throttles in accordance with the target throttle opening.

SUMMARY OF THE INVENTION

The vibrations of the vehicle cannot be prevented effectively by means of the above throttle control apparatus. Hence, the use of an inverse filter to control the transmission torque of a start clutch disposed between an engine and a transmission in a vehicle has been newly proposed. In this newly-proposed clutch control technique, however, the actual vehicle model of the inverse filter is fixed even though the transmission ratio differs under vehicle start and reacceleration. As a result, the vehicle vibrations cannot be prevented sufficiently by the newly-proposed clutch control technique under vehicle start and reacceleration.

It is therefore an object of the present invention to provide a system for controlling a start clutch disposed between an engine and a transmission in a vehicle while preventing the occurrence of shaking vibrations of the vehicle efficiently even under vehicle start or reacceleration.

It is also an object of the present invention to provide a method for controlling a start clutch disposed between an engine and a transmission in a vehicle.

According to a first aspect of the invention, there is provided a start clutch control system for a vehicle, comprising: a start clutch disposed between an engine and a transmission in the vehicle; a detection unit that detects vehicle running conditions including at least a vehicle speed; and a control unit that controls engagement and disengagement of the start clutch according to the detected vehicle running conditions, the control unit including: a target torque determining section to determine a target torque transmitted by the start clutch with reference to the vehicle running conditions; a torque transmission characteristic setting section to set a transmission characteristic of the target torque differently depending on the vehicle speed; a phase compensating section to make a phase compensation for the torque transmission characteristic based on actual and target mathematical models of the vehicle; and a clutch control section to control the start clutch according to the phase-compensated torque transmission characteristic.

According to a second aspect of the invention, there is provided a control device for a start clutch disposed between an engine and a transmission in a vehicle, the control device comprising: means for detecting vehicle running conditions including a vehicle speed and an engine throttle opening; means for judging whether the detected vehicle speed is higher than or equal to a given vehicle speed threshold; means for determining a target transmission torque of the start clutch according to the detected engine throttle opening; first target filtering means for filtering the target transmission torque to set a first torque transmission characteristic; second target filtering means for filtering the target transmission torque to set a second torque transmission torque differently from the first torque transmission characteristic; means for switching between said first and second target filtering means so as to output the first torque transmission characteristic when the detected vehicle speed is higher than or equal to the vehicle speed threshold and to output the second torque transmission characteristic when the detected vehicle speed is lower than the vehicle speed threshold; phase compensating means for making a phase compensation for the outputted torque transmission characteristic; and means for controlling the start clutch according to the phase-compensated torque transmission characteristic.

According to a third aspect of the invention, there is provided a control method for a start clutch disposed between an engine and a transmission in a vehicle, the method comprising: detecting vehicle running conditions including a vehicle speed and an engine throttle opening; judging whether the detected vehicle speed is higher than or equal to a given vehicle speed threshold; determining a target transmission torque of the start clutch according to the detected engine throttle opening; filtering the target transmission torque to set different first and second torque transmission characteristics; outputting the first torque transmission characteristic when the detected vehicle speed is higher than or equal to the vehicle speed threshold and outputting the second torque transmission characteristic when the detected vehicle speed is lower than the vehicle speed threshold; making a phase compensation for the outputted torque transmission characteristic; and controlling the start clutch according to the phase-compensated torque transmission characteristic.

The other objects and features of the invention will also become understood from the following description.

DESCRIPTION OF THE EMBODIMENTS

The present invention will be described below with reference to the drawings.

Figure 1A:
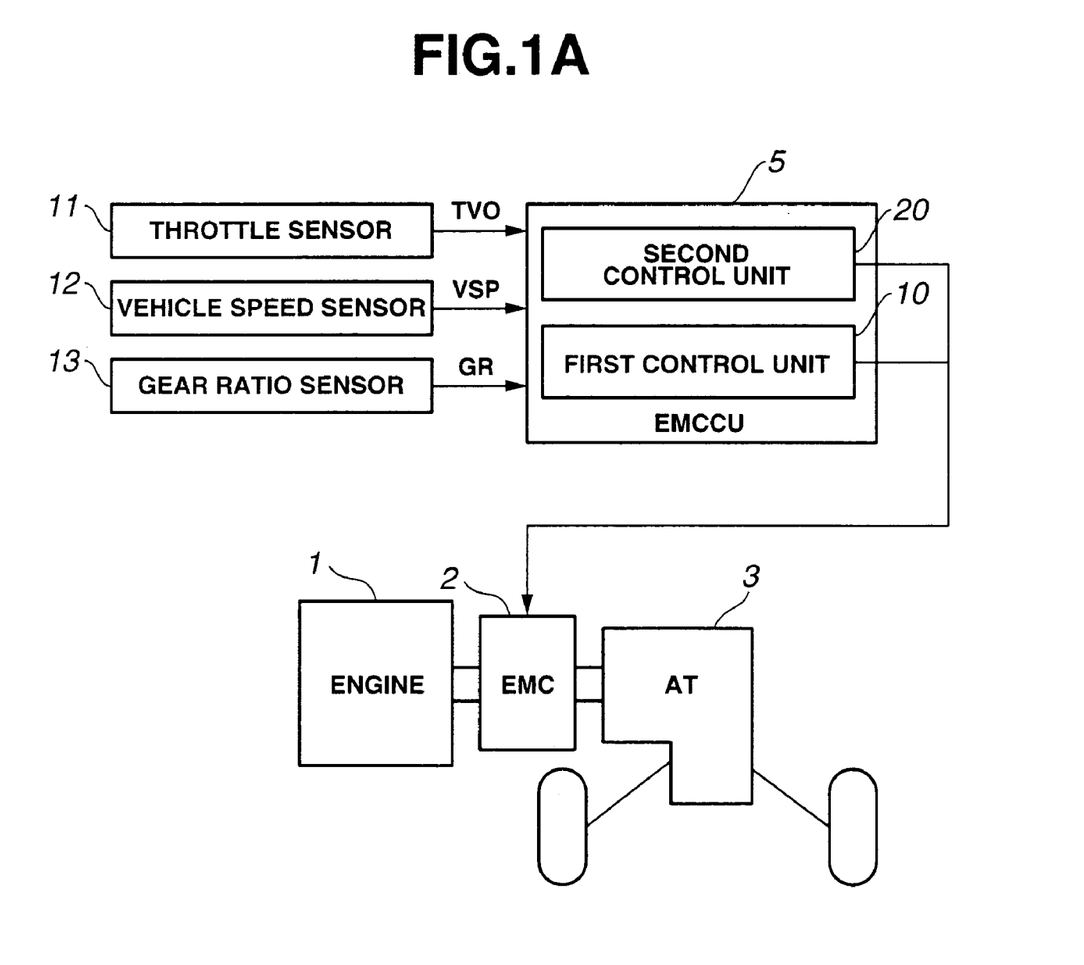
FIG. 1A is a schematic diagram of a start clutch control system according to one exemplary embodiment of the invention.

Referring to FIG. 1A, there is provided a vehicle in which the present invention is embodied, including an engine 1, an automatic transmission (AT) 3, an electromagnetic multiple-disc clutch (EMC) 2 as a start clutch disposed between the engine 1 and the automatic transmission 3 and a clutch control device (EMCCU) 5.

Figure 1B:
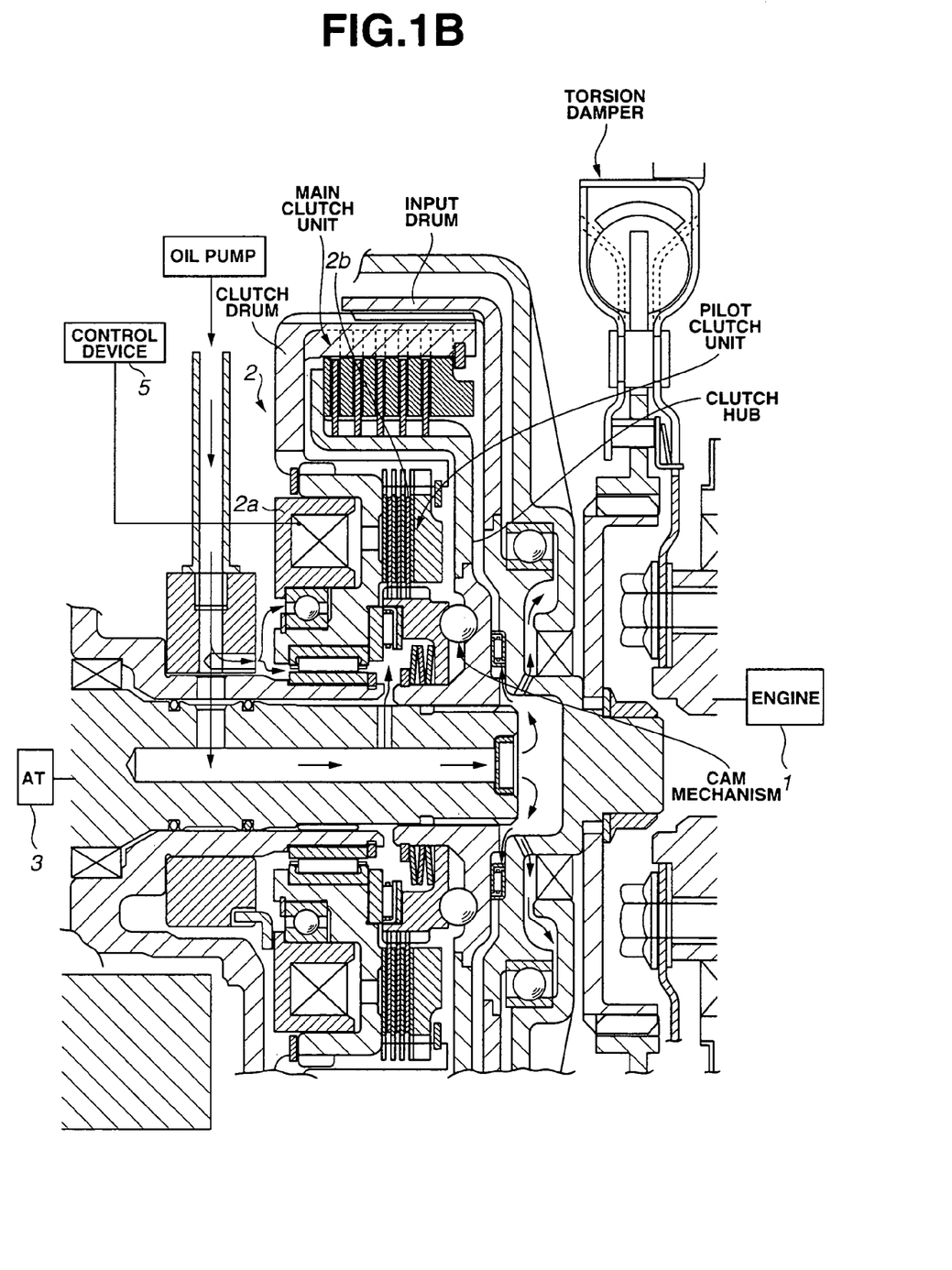
FIG. 1B is a schematic diagram of a start clutch according to one exemplary embodiment of the invention.

The electromagnetic multiple-disc clutch 2 can employ a known electromagnetic multiple-disc clutch mechanism. One example of electromagnetic multiple-disc clutch mechanism is discussed in U.S. Pat. No. 6,676,563, which is herein incorporated by reference. Namely, the electromagnetic multiple-disc clutch 2 may have a main clutch unit and a pilot clutch unit with an electromagnet 2*a* and a plurality of clutch disc plates 2*b* as shown in FIG. 1B. The electromagnet 2*a* generates an electromagnetic field upon energization thereof. The clutch plates 2*b* are attracted to the electromagnet 2*b* and forced together under the electromagnetic field so that the pilot clutch unit comes into engagement and outputs engine power to a drum of the main clutch unit via a cam mechanism. The clutch drum shifts upon receipt of the engine power to thereby move the main clutch unit into engagement. In this state, the engine power inputted into an input drum via a torsion damper is transmitted to the transmission 3 via a clutch hub. The engagement state of the electromagnetic multiple-disc clutch 2, i.e., the transmission torque of the electromagnetic multiple-disc clutch 2 is thus varied depending on the amount of an electric current supplied to the electromagnet 2*a* of the clutch 2.

The automatic transmission 3 is a continuously variable transmission having a primary pulley and a secondary pulley drivingly connected with the primary pulley so as to change its gear ratio by controlling a rotation peed ratio between the primary pulley and the secondary pulley. Alternatively, the transmission 3 may be a stepwise transmission.

The vehicle further includes a vehicle condition detection unit provided with a throttle sensor 11, a vehicle speed sensor 12 and a gear ratio sensor 13 to detect the throttle opening amount TVO of the engine 1, a vehicle speed VSP and a gear ratio GR of the automatic transmission 3, respectively, and to output signals responsive to the detection values TVO, VSP and GR to the clutch control device 5. Herein, the gear ratio sensor 13 measures primary and secondary pulley rotation speeds and calculates the gear ratio GR from the measured primary and secondary pulley rotation speeds.

The clutch control device 5 controls the engagement and disengagement of the electromagnetic multiple-disc clutch 2 through current regulation in accordance with the detected vehicle running conditions TVO, VSP and GR. Referring again to FIG. 1A, the clutch control device 5 includes a first control unit 10 to control the electromagnetic multiple-disc clutch 2 when the vehicle is in a normal running mode and a second control unit 20 to control the electromagnetic multiple-disc clutch 2 when the vehicle is in a start/reacceleration mode.

When the vehicle is in the normal running mode, the first control unit 10 determines a maximum limit of torque transmitted by the electromagnetic multiple-disc clutch 2 based on the detected throttle opening TVO and generates a clutch control signal to regulate the current supply to the clutch 2 and thereby control the engagement and disengagement of the clutch 2 according to the maximum transmission torque limit without slip control.

When the vehicle is in the start/reacceleration mode, the second control unit 20 determines a target transmission torque T* of the electromagnetic multiple-disc clutch 2 based on the detected vehicle running conditions including the throttle opening TVO, sets a transmission characteristic FT*(t) of the target clutch torque T* depending on the vehicle speed VSP, compensates for a phase delay in the torque transmission characteristic FT*(t), and then, generates a clutch control signal to regulate the current supply to the clutch 2 and thereby control the engagement and disengagement of the clutch 2 according to the thus-obtained phase-compensated torque transmission characteristic fkT*(t). In the present embodiment, the torque transmission characteristic FT*(t) is set differently depending on whether the vehicle is in a start state where vehicle inertia is high (i.e. the vehicle speed VSP is very low so that the vehicle is nearly parked) or in a reacceleration state where vehicle inertia is low.

Figure 2:
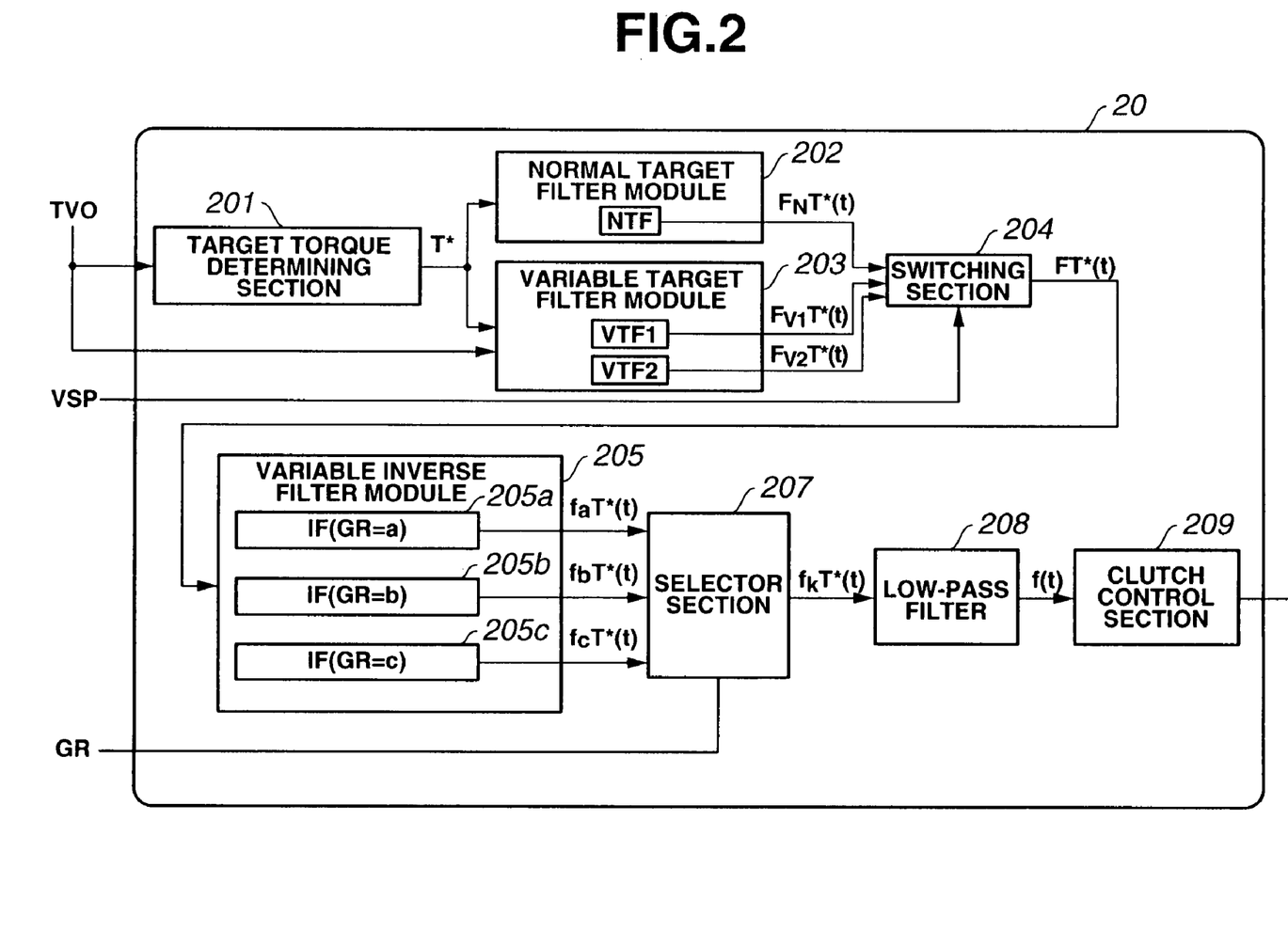
FIG. 2 is a block diagram of a control unit of the start clutch control system according to one exemplary embodiment of the invention.

As shown in FIG. 2, the second control unit 20 includes a target torque determining section 201, a torque transmission characteristic setting section equipped with a normal target filter module 202 and a variable target filter module 203, a switching section 204, a phase compensating section equipped with a variable inverse filter module 205, a selector section 207, a low-pass filter 208 and a clutch control section 209.

Figure 4:
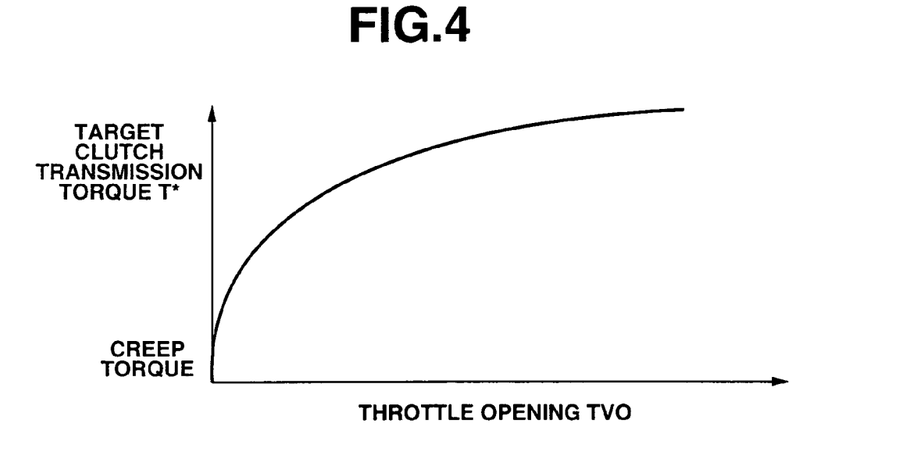
FIG. 4 is a map showing a relationship between throttle opening and target clutch torque according to one exemplary embodiment of the invention.

The target torque determining section 201 stores therein a target torque characteristic map that defines a relationship between throttle opening TVO and target transmission torque T* as shown in FIG. 4, and determines a target transmission value T* of the clutch 2 according to the detected throttle opening TVO with reference to the target torque characteristic map.

The normal target filter module 202 has a normal target filter NTF to set a transmission characteristic $F_N T^*(t)$ of the target torque T* for vehicle reacceleration. Herein, the torque transmission characteristic $F_N T^*(t)$ is given as a function of time.

The variable target filter module 203 has variable target filters VTF1 and VTF2 to set transmission characteristics $F_{V1} T^*(t)$ and $F_{V2} T^*(t)$ of the target torque T*, respectively, for vehicle start depending on the detected throttle opening TVO. Each of the torque transmission characteristics $F_{V1} T^*(t)$ and $F_{V2} T^*(t)$ is also given as a function of time.

The switching section 204 switches between the filter modules 202 and 203 to select any appropriate one of the target filters NTF, VTF1 and VTF2 according to the vehicle speed VSP, and then, generates an output from the selected target filter NTF, VTF1 or VTF2 as the target torque transmission characteristic FT*(t).

The variable inverse filter module 205 has a plurality of inverse filters 205*a*, 205*b* and 205*c*. Each of the inverse filters 205*a*, 205*b* and 205*c* is set based on actual and target mathematical models of the vehicle to make a phase compensation for the torque transmission characteristic FT*(t) through the operation of the target vehicle model with the inverse of the actual vehicle model. The actual vehicle models of the inverse filters 205a, 205b and 205c are set differently corresponding to different gear ratio values a, b and c. Upon receipt of the output signal FT*(t), the inverse filters 205a, 205b and 205c convert the signal FT*(t) in such a manner that the thus-obtained torque transmission characteristics faT*(t), fbT*(t) and fcT*(t) match the target vehicle models so as to obtain desired vehicle features regardless of actual vehicle features. The torque transmission characteristic FT*(t) is passed through the inverse filters 205a, 205b and 205c concurrently to output three different phase-compensated torque transmission characteristics faT*(t), fbT*(t) and fcT*(t). It should be noted that, although the inverse filter module 205 has three inverse filters 205a, 205b and 205c, there is no particular limitation on the number of inverse filters in the module 205. One or more additional inverse filters may alternatively be provided in the module 205.

The selector section 207 selects one of the inverse filters 205a, 205b and 205c having its mathematical vehicle model set corresponding to the gear ratio value nearest to the detected current gear ratio GR and generates an output from the selected inverse filter 205a, 205b or 205c as the inverse-filtered torque transmission characteristic fkT*(t).

The low-pass filter 208 smooth outs the inverse filter output fkT*(t) by its first-order lag characteristics to eliminate a sudden change in the filter output.

Figure 5:
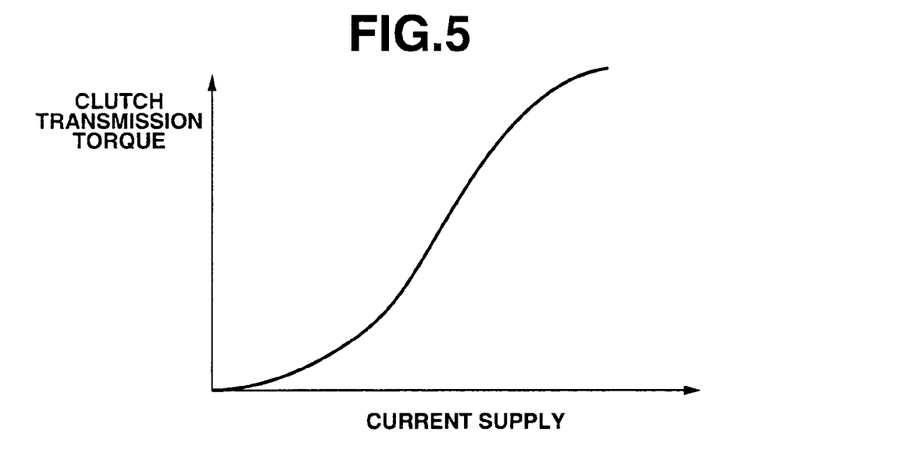
FIG. 5 is a map showing a relationship between current supply and clutch torque according to one exemplary embodiment of the invention.

The clutch control section 209 stores therein a current supply regulation map that defines a relationship between clutch torque and current supply as shown in FIG. 5, and regulates the amount of electric current supplied to the clutch 2 according to the thus-obtained torque transmission characteristic f(t) with reference to the current supply regulation map.

Figure 3:
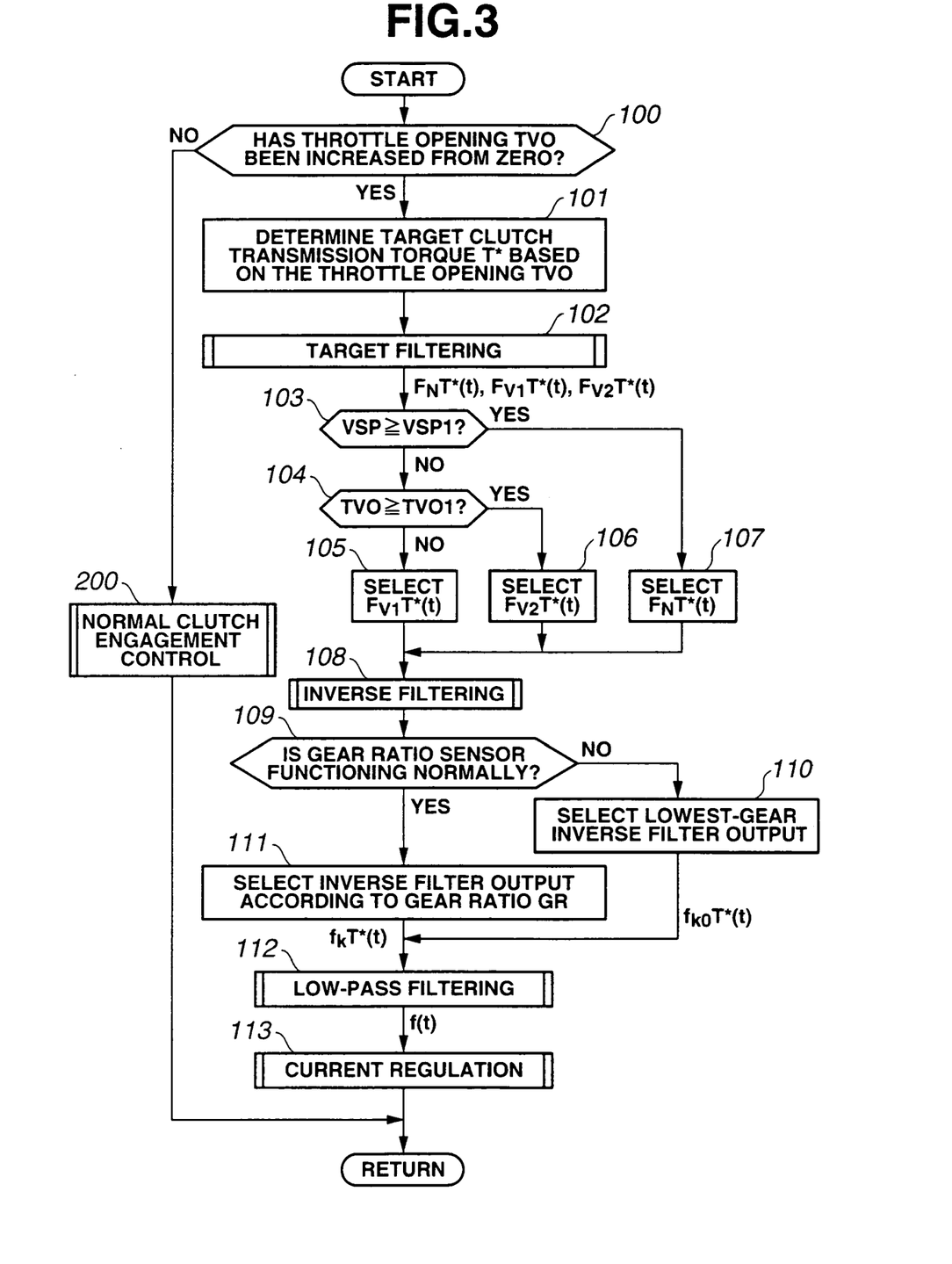
FIG. 3 is a flow chart for clutch engagement control of the start clutch control system according to one exemplary embodiment of the invention.

More specifically, the engagement of the electromagnetic multiple-disc clutch 2 is controlled through the execution of a clutch control program by the clutch control device 5 executes a clutch control program as shown in FIG. 3.

At step S100, the control device 5 judges whether the throttle opening TVO has been increased from "0" (i.e. whether the throttle of the engine 1 has been actuated from the totally closed position). If Yes in step S100, the control device 5 determines that the vehicle is in the start/reacceleration mode. Then, the program proceeds to step S101 so that the control device 5 actuates the second control unit 20. If No in step S100, the control device 5 determines that the vehicle is in the normal running mode and actuates the first control unit 10 to perform normal clutch engagement control in step S200.

At step S101, the control unit 20 allows the target torque determining section 201 to determine a target transmission torque T* of the clutch 2 according to the detected current throttle opening TVO with reference to the target torque characteristic map.

At step S102, the control unit 20 allows the filter modules 202 and 203 to pass the target transmission torque T* through the target filters NFT, VTF1 and VTF2, respectively.

At step S103, the control unit 20 allows the switching section 204 to judge whether the vehicle speed VSP is higher than or equal to a predetermined value VSP1 (e.g. 8 km/h). If Yes in step S103, it is judged that the vehicle has been running and brought to the reacceleration state upon accelerator pedal operation. Then, the program proceeds to step S107. If No in step S103, it is judged that the vehicle has been parked and brought to the start state upon accelerator pedal operation. The program then proceeds to step S104.

At step S104, the control unit 20 allows the switching section 204 to judge whether the throttle opening TVO is larger than or equals to a predetermined value TVO1 (e.g. ⅝). If Yes in step S104, it is judged that the vehicle is being accelerated at full throttle. Then, the program proceeds to step S106. If No in step S104, it is judged that the vehicle is not accelerated at full throttle. The program then proceeds to step S105.

At step S105, the control unit 20 enables the switching section 204 to select the output $F_{V1}T^*(t)$ of the variable target filter VTF1 as the torque transmission characteristic FT*(t).

At step S106, the control unit 20 enables the switching section 204 to select the output $F_{V2}T^*(t)$ of the variable target filter VTF2 as the torque transmission characteristic FT*(t).

At step S107, the control unit 20 enables the switching section 204 to select the output $F_N T^*(t)$ of the normal target filter NTF as the torque transmission characteristic FT*(t).

At step S108, the control unit 20 allows the inverse filter module 108 to pass the torque transmission characteristic FT*(t) through the inverse filters 205a, 205b and 205c, respectively.

At step S109, the control unit 20 allows the selector section 207 to judge whether the gear ratio sensor 13 is functioning normally. If Yes in step S109, the program proceeds to step S111. If No in step S109, the program proceeds to step S110.

At step S110, the control unit 20 enables the selector section 207 to select an inverse filter output $f_{k0}T^*(t)$ corresponding to the lowest gear $GR_{k0}$. Herein, the degree of vehicle vibrations is largest at the lowest gear GR. The torque transmission characteristic $f_{k0}T^*(t)$ is thus set so as to prevent such large vibrations.

At step S111, the control unit 20 enables the selector section 207 to selects, as the inverse-filtered torque transmission characteristic fkT*(t), either one of the outputs faT*(t), fbT*(t) and fcT*(t) of the inverse filters 205a, 205b and 205c corresponding to the gear ratio value nearest to the detected current gear gear GR.

At step S112, the low-pass filter 208 gives a first-order lag function f(t) of the inverse-filtered torque transmission characteristic fkT*(t).

At step S113, the clutch control section 208 outputs a command to regulate the supply of electric current to the electromagnetic multiple-disc clutch 2 according to the output f(t) of the low-pass filter 208 with reference to the current supply regulation map.

Figure 6:
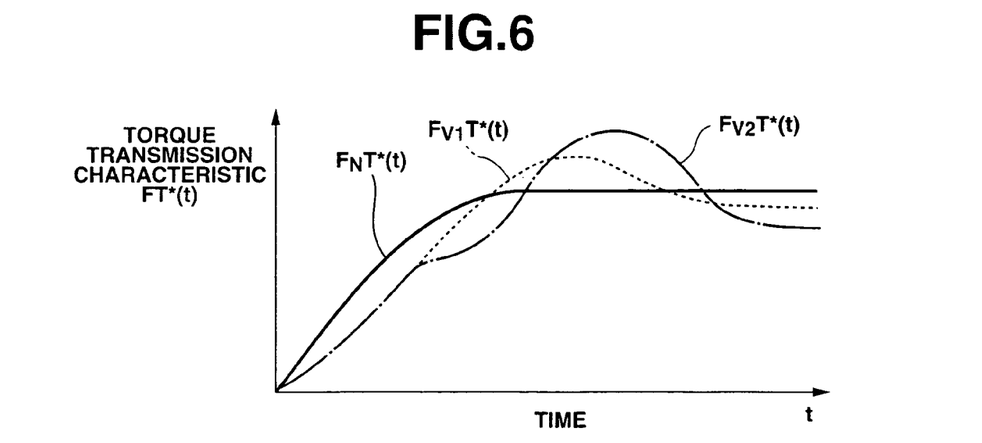
FIG. 6 is a map showing clutch torque transmission characteristics according to one exemplary embodiment of the invention.

In the above clutch engagement control procedure, the torque transmission characteristic $F_{V1}T^*(t)$ or $F_{V2}T^*(t)$ is selected when the vehicle starts from a stop state (VSP<VSP1). Further, the torque transmission characteristic $F_{V1}T^*(t)$ is selected when the vehicle starts gradually (TVO<TVO1), and the torque transmission characteristic $F_{V2}T^*(t)$ is selected when the vehicle starts at full throttle (TVO≧TVO1). Each of the torque transmission characteristics $F_{V1}T^*(t)$ and $F_{V2}T^*(t)$ has an overshoot range in which the torque transmission characteristic $F_{V1}T^*(t)$, $F_{V2}T^*(t)$ overshoots the normal torque transmission characteristic $F_N T^*(t)$, as shown in FIG. 6, so that the rise time of the torque transmission characteristic $F_{V1}T^*(t)$, $F_{V2}T^*(t)$ is made longer than that of the torque transmission characteristic $F_N T^*(t)$. This makes it possible to reduce engine load, increase engine speed and thereby secure engine inertia torque. The starting performance of the vehicle can be ensured by virtue of such an engine inertia torque. It is desirable to secure a larger engine inertia torque especially when the vehicle starts at full throttle. The rise time of the torque transmission characteristic $F_{V_2}T^*(t)$ is thus made longer than that of the torque transmission characteristic $F_{V_1}T^*(t)$, so as to give a larger torque transmission characteristic overshoot.

It is not so necessary to secure engine inertia torque when the vehicle has already started running for the reason that vehicle driving wheel inertia is relatively small. The torque transmission characteristic $F_N T^*(t)$ is thus selected when the vehicle is being reaccelerated (VSP≧VSP1). As shown in FIG. 6, the torque transmission characteristic $F_N T^*(t)$ rises smoothly without overshooting.

In this way, the clutch control device 5 is able to control the engagement of the electromagnetic multiple-disc clutch 2 appropriately according to the vehicle running conditions while preventing the occurrence of vehicle vibrations assuredly even under vehicle start or reacceleration.

The torque transmission characteristic $FT^*(t)$ is processed with the inverse filters 205a, 205b and 205c concurrently, and then, any appropriate one of the inverse-filtered torque transmission characteristics $faT^*(t)$, $fbT^*(t)$ and $fcT^*(t)$ is selected depending on the current gear ratio GR. Namely, the phase compensation for the torque transmission characteristic $FT^*(t)$ is made in parallel with the reading of the real-time gear ratio GR. The control device 5 is thus able to perform the clutch control process (including the inverse filtering and the gear ratio measurement) efficiently without time losses and to avoid a deterioration in control response.

The inverse-filtered torque transmission characteristic $fkT^*(t)$ is processed with the low-pass filter 208 so as to smooth out the inverse filter output $fkT^*(t)$ by the first-order lag characteristics of the low-pass filter 208 and to prevent a sudden change in acceleration when the vehicle conditions VSP, TVO and GR vary abruptly.

Figure 7:
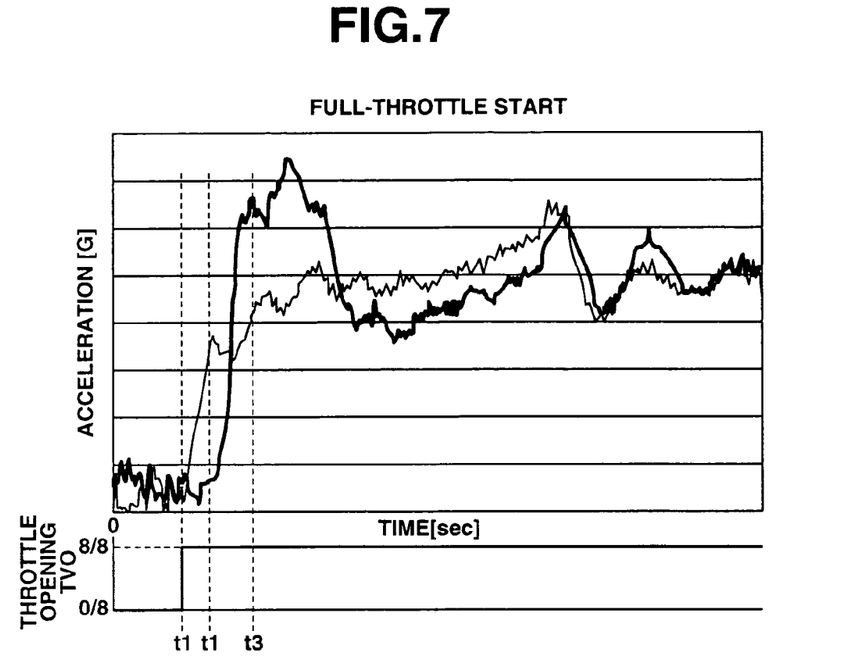
FIG. 7 is a time chart showing changes in acceleration under a vehicle start state according to one exemplary embodiment of the invention.

The behavior of the vehicle under full-throttle start will be now explained below with reference to FIG. 7. In FIG. 7, heavy and thin lines indicate changes in acceleration G caused through the use of the variable target filter VTF2 and the normal target filter NTF, respectively, for the setting of torque transmission characteristic.

It is now assumed that the vehicle starts at full throttle upon accelerator pedal operation at the time t1. In the case of using the output $F_N T^*(t)$ of the normal target filter NTF as the torque transmission characteristic under full-throttle start, the acceleration G rises rapidly in the initial stage but the increase of the acceleration G becomes sluggish at the time t2 due to insufficient engine inertia. In the case of using the output $F_{V_2}T^*(t)$ of the variable target filter VTF2 as the torque transmission characteristic under full-throttle start, it is possible to obtain a sufficient level of acceleration G at the time t3 although the rise of the acceleration G is somewhat slow.

Figure 8:
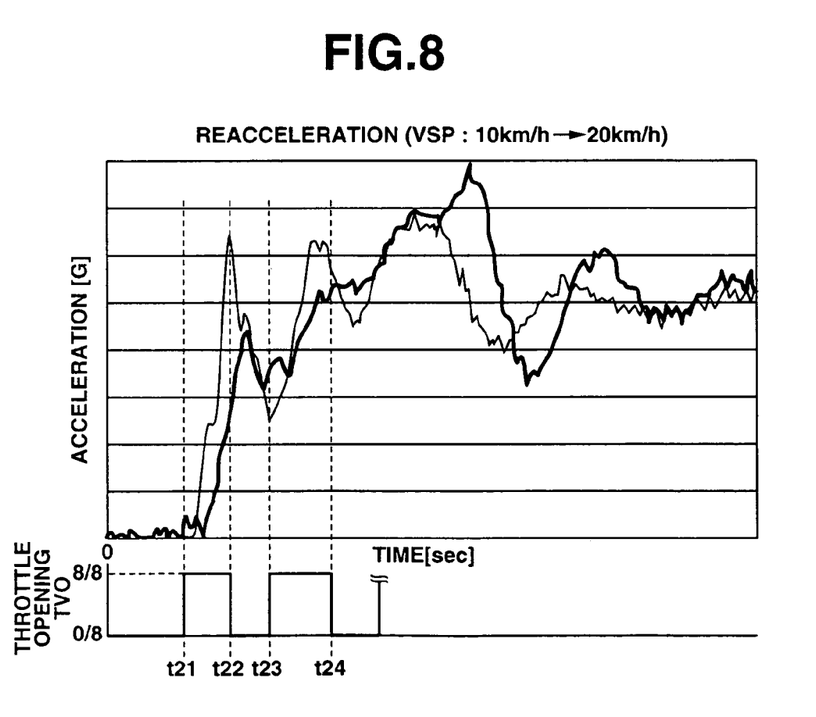
FIG. 8 is a time chart showing changes in acceleration under a vehicle reacceleration state according to one exemplary embodiment of the invention.

The behavior of the vehicle under full-throttle reacceleration will be explained below with reference to FIG. 8. In FIG. 8, heavy and thin lines indicate changes in acceleration G caused through the use of appropriate one of the inverse filters 205a, 205c and 205c and through the use of an inverse filter (with its actual vehicle model set corresponding a fixed gear ratio), respectively, for the phase compensation of the torque transmission characteristic.

It is now assumed that the engine 1 is put on full throttle at the time t21 (t23) when the vehicle speed VSP is 10 km/h, and then, the throttle is totally closed at the time t22 (t24) when the vehicle speed VSP reaches 20 km/h. In the case of using the fixed-gear-ratio inverse filter regardless of the actual gear ratio, the thus-obtained torque transmission characteristics $fkT^*(t)$ does not match well with the target vehicle model. As a result, there arise large acceleration changes to cause vehicle shaking vibrations. In the case of selecting/using any appropriate one of the inverse filter outputs $faT^*(t)$, $fbT^*(t)$ and $fcT^*(t)$ corresponding to the actual gear ratio GR as the phase-compensated torque transmission characteristic $fkT^*(t)$, such large acceleration changes can be avoided to thereby prevent the occurrence of vehicle shaking vibrations assuredly even under reacceleration.

As described above, the control device 5 is configured to determine a target torque to transmitted by the clutch 2, set a transmission characteristic of the target torque differently depending on the vehicle speed, make a phase compensation for the torque transmission characteristic based on actual and target mathematical models of the vehicle, and then, control the clutch 2 according to the phase-compensated torque transmission characteristic. It becomes therefore possible in the present embodiment to prevent the occurrence of vehicle vibrations assuredly even under vehicle start or reacceleration while insuring good vehicle starting performance.

The entire contents of Japanese Patent Application No. 2004-045609 (filed on Feb. 23, 2004) are herein incorporated by reference.

Although the present invention has been described with reference to a specific embodiment of the invention, the invention is not limited to the above-described embodiment. Various modification and variation of the embodiment described above will occur to those skilled in the art in light of the above teaching. The scope of the invention is defined with reference to the following claims.

What is claimed is:

1. A start clutch control system for a vehicle, comprising:
    a start clutch disposed between an engine and a transmission in the vehicle;
    a detection unit that detects vehicle running conditions including at least a vehicle speed; and
    a control unit that controls engagement and disengagement of the start clutch according to the detected vehicle running conditions, the control unit including:
    a target torque determining section to determine a target torque transmitted by the start clutch with reference to the vehicle running conditions;
    a torque transmission characteristic setting section to set a transmission characteristic of the target torque differently depending on the vehicle speed;
    a phase compensating section to make a phase compensation for the torque transmission characteristic based on actual and target mathematical models of the vehicle; and
    a clutch control section to control the start clutch according to the phase-compensated torque transmission characteristic.

2. The start clutch control system of claim 1,
    the start clutch being an electromagnetic multiple-disc clutch that has an electromagnet generating an electromagnetic field upon energization thereof and a plurality of clutch disc plates attracted to the electromagnet under the electromagnetic field so as to bring the clutch into engagement, and
    the clutch control section regulating the supply of an electric current to the electromagnet of the electromagnetic multiple-disc clutch according the torque transmission characteristic.

3. The start clutch control system of claim 1,
    the detection unit further detecting a gear ratio of the transmission, the phase compensating section including a plurality of phase compensation filters that have their respective actual vehicle models set corresponding to different gear ratio values to phase-compensate the torque transmission characteristic differently, the control unit including a selector section to selects one of the differently phase-compensated torque transmission characteristics according to the detected gear ratio, and the clutch control section controlling the start clutch according to said selected one of the phase-compensated torque transmission characteristics.

4. The start clutch control system of claim 1, the detection unit further detecting a throttle opening of the engine, and the torque transmission characteristic setting section setting the torque transmission characteristic differently depending on the detected throttle opening.

5. A control device for a start clutch disposed between an engine and a transmission in a vehicle, the control device comprising:

means for detecting vehicle running conditions including a vehicle speed and an engine throttle opening;

means for judging whether the detected vehicle speed is higher than or equal to a given vehicle speed threshold;

means for determining a target transmission torque of the start clutch according to the detected engine throttle opening;

first target filtering means for filtering the target transmission torque to set a first torque transmission characteristic;

second target filtering means for filtering the target transmission torque to set a second torque transmission torque differently from the first torque transmission characteristic;

means for switching between said first and second target filtering means so as to output the first torque transmission characteristic when the detected vehicle speed is higher than or equal to the vehicle speed threshold and to output the second torque transmission characteristic when the detected vehicle speed is lower than the vehicle speed threshold;

phase compensating means for making a phase compensation for the outputted torque transmission characteristic; and means for controlling the start clutch according to the phase-compensated torque transmission characteristic.

6. The control device of claim 5, wherein the second torque transmission characteristic has a rise time longer than that of the first torque transmission characteristics and overshoots the first torque transmission characteristic in a predetermined range.

7. The control device of claim 6, further comprising:

third target filtering means for filtering the target transmission torque to set a third torque transmission characteristic; and means for judging whether the detected throttle opening is larger than or equal to a given throttle opening threshold, wherein the third torque transmission characteristics has a rise time longer than that of the second torque transmission characteristic and overshoots the first torque transmission characteristic more largely in a predetermined range, and said switching means switches among said first, second and third target filtering means so as to output the first torque transmission characteristic when the detected vehicle speed is higher than or equal to the vehicle speed threshold, to output the second torque transmission characteristic when the detected throttle opening is smaller than the throttle opening threshold and the detected vehicle speed is lower than the vehicle speed threshold, and then, to output the third torque transmission characteristic when the detected throttle opening is larger than or equal to the throttle opening threshold and the detected vehicle speed is lower than the vehicle speed threshold.

8. The control device of claim 5, wherein said detecting means further detects a gear ratio of the transmission, said phase compensating means has first inverse filter means for inverse filtering the outputted torque transmission characteristic and second inverse filtering means for inverse filtering the outputted torque transmission characteristic concurrently with and differently from said first inverse filter means, the control device further includes means for selecting either one of the torque transmission characteristics filtered by said first and second inverse filter means according to the detected gear ratio, and said controlling means controls the start clutch according to said selected one of the inverse-filtered torque transmission characteristics.

9. The control device of claim 5, wherein the start clutch is an electromagnetic multiple-disc clutch having an electromagnet that generates an electromagnetic field upon energization thereof and a plurality of disc plates that are attracted to the electromagnet under the electromagnetic field so as to bring the clutch into engagement, and said controlling means has means for regulating the supply of an electric current to the electromagnet according to the phase-compensated torque transmission characteristic.

10. A control method for a start clutch disposed between an engine and a transmission in a vehicle, the method comprising:

detecting vehicle running conditions including a vehicle speed and an engine throttle opening;

judging whether the detected vehicle speed is higher than or equal to a given vehicle speed threshold;

determining a target transmission torque of the start clutch according to the detected engine throttle opening;

filtering the target transmission torque to set different first and second torque transmission characteristics;

outputting the first torque transmission characteristic when the detected vehicle speed is higher than or equal to the vehicle speed threshold and outputting the second torque transmission characteristic when the detected vehicle speed is lower than the vehicle speed threshold;

making a phase compensation for the outputted torque transmission characteristic; and controlling the start clutch according to the phase-compensated torque transmission characteristic.

11. The control method of claim 10, wherein the start clutch is an electromagnetic multiple-disc clutch having an electromagnet that generates an electromagnetic field upon energization thereof and a plurality of disc plates that are attracted to the electromagnet under the electromagnetic field so as to bring the clutch into engagement, and the supply of an electric current to the electromagnet is regulated according to the phase-compensated torque transmission characteristic.

* * * * *